United States Patent
Tessnow et al.

(10) Patent No.: US 8,920,010 B2
(45) Date of Patent: Dec. 30, 2014

(54) HEADLAMP HAVING AN INTEGRATED LOW AND HIGH BEAM ASSEMBLY

(71) Applicants: Thomas Tessnow, Weare, NH (US); Jonathan Dunlap, Hopkinton, NH (US); Lawrence M. Rice, Hillsboro, NH (US)

(72) Inventors: Thomas Tessnow, Weare, NH (US); Jonathan Dunlap, Hopkinton, NH (US); Lawrence M. Rice, Hillsboro, NH (US)

(73) Assignee: Osram Sylvania Inc., Danvers, MA (US)

(*) Notice: Subject to any disclaimer, the term of this patent is extended or adjusted under 35 U.S.C. 154(b) by 274 days.

(21) Appl. No.: 13/646,766

(22) Filed: Oct. 8, 2012

(65) Prior Publication Data
US 2014/0098555 A1 Apr. 10, 2014

(51) Int. Cl.
*F21V 7/09* (2006.01)
*B60Q 1/04* (2006.01)
*F21S 8/10* (2006.01)

(52) U.S. Cl.
CPC ............. *B60Q 1/04* (2013.01); *F21S 48/1159* (2013.01); *F21V 7/09* (2013.01); *F21S 48/137* (2013.01); *F21S 48/1154* (2013.01)
USPC ............................ 362/518; 362/538; 362/545

(58) Field of Classification Search
CPC ............. B60Q 1/04; B60Q 1/18; F21V 7/00; F21V 7/09; F21S 48/1388; F21S 48/1154; F21S 48/1159; F21S 48/23; F21S 48/137; F21S 48/1358; F21S 48/1364; F21S 48/215
USPC ......... 362/241, 242, 243, 297, 346, 516, 517, 362/518, 538, 543, 545
See application file for complete search history.

(56) References Cited

U.S. PATENT DOCUMENTS

| | | | | | |
|---|---|---|---|---|---|
| 1,214,309 | A | * | 1/1917 | Jillson et al. | 362/346 |
| 1,961,836 | A | * | 6/1934 | Warner | 362/517 |
| 2,755,374 | A | * | 7/1956 | Ott et al. | 362/247 |
| 7,699,514 | B2 | * | 4/2010 | Shimada | 362/545 |
| 7,896,532 | B2 | | 3/2011 | Hsu et al. | |
| 2009/0296418 | A1 | | 12/2009 | Luo et al. | |

* cited by examiner

*Primary Examiner* — Y M Lee
(74) *Attorney, Agent, or Firm* — Edward S. Podszus

(57) ABSTRACT

An automotive headlamp (12) having first and second solid-state light sources (44, 46) and a reflector (26) having a light collecting region (28) and an aperture (40) defined therein. The light collecting region (28) of the reflector (26) is adapted to receive and reflect light emitted by the first solid-state light source (44) in a first illumination pattern. The second solid-state light source (46) is adapted to emit light through the aperture (40) in a second illumination pattern.

14 Claims, 13 Drawing Sheets

HEADLAMP HAVING AN INTEGRATED LOW AND HIGH BEAM ASSEMBLY

CROSS REFERENCE TO RELATED APPLICATIONS

N/A

TECHNICAL FIELD

The present disclosure relates to lighting systems, and, more particularly, to a bi-functional automotive headlamp having an integrated low and high-beam assembly.

BACKGROUND

Lighting systems are well-known and are used in a wide variety of applications, including automotive applications. Generally, an automotive headlamp, for example, includes a light source and optical components, such as lenses and reflectors to collect and shape light emitted by the light source and to project the resulting beam pattern forward of the vehicle in a light distinct pattern. It may be preferred that a single automotive headlamp system be capable of projecting more than one beam pattern (i.e. a bi-functional headlamp). For example, a headlamp may emit light in a low-beam mode in which light is generally emitted below the horizon. The headlamp may also emit light in a high beam mode in which light is generally emitted above and below the horizon.

Some bi-functional headlamp systems include multiple light sources for the low and high beam modes. For example, some filament headlamp systems include multiple filaments: one filament for the low beam function, and another filament for the high beam function. Similarly, some light emitting diode (LED) headlamp systems include multiple strings of LED modules or chips; one string of LEDs for the low beam function, and another string of LEDs for the high beam function. Some headlamp systems further include a mechanism for adjusting the light sources and/or other components of the headlamp, such as the reflector, to produce the low beam and high beam functions. Additionally, some bi-functional headlamp systems, such as, for example, a projector headlamp, utilize a single shutter or light shield to selectively block a portion of the light from a single light source to provide a low beam pattern and, to provide a high beam pattern, the shielded light is added to the beam by retraction of the shield. Examples of headlamp reflectors are found in U.S. Pat. No. 7,896,532 (Hsu) and U.S. Patent Pub. No. 2009/0296418 (Luo).

These types of known bi-functional headlamp systems have limitations. For example, one drawback associated with bi-functional headlamp systems having multiple light sources is the amount of space required for each light source. More specifically, each discrete light source (e.g., low-beam light source, high-beam light source) generally requires an associated compartment, or cavity, to house and contain each light source and, in some cases, an associated reflector, within. Although projector headlamps may require less space than multiple light source headlamps (due to the use of a single light source), projector headlamps are limiting with respect to styling options and are generally less efficient and provide lower performance when compared to reflector headlamps, particular in low-beam mode.

BRIEF DESCRIPTION OF THE DRAWINGS

Reference should be made to the following detailed description which should be read in conjunction with the following figures, wherein like numerals represent like parts.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient. Also, it should be understood that the phraseology and terminology used herein is for the purpose of description and should not be regarded as limiting.

DETAILED DESCRIPTION

By way of an overview, one aspect consistent with the present disclosure may feature a vehicle lighting system including a bi-functional headlamp having an integrated low and high-beam assembly. The headlamp includes a first light engine including a first solid-state light source (i.e. a single string of one or more LEDs) and a second light engine including a second solid-state light source. The headlamp further includes a reflector having a light collecting region and an aperture defined therein. The light collecting region of the reflector is adapted to receive and reflect visible light emitted by the first solid-state light source in a first illumination pattern. The second solid-state light source is adapted to emit visible light through the aperture in the reflector in a second illumination pattern. In one embodiment, the first illumination pattern is a low-beam illumination pattern, in which light is generally emitted below or at and below a horizontal plane, and the second illumination pattern is a high-beam illumination pattern, in which light is generally emitted both above and below the horizontal plane. When the light is directed below or at and below the horizontal plane, it is generally emitted in a direction directed below or at and below the horizon, which is a virtual plane located far ahead of the vehicle.

A headlamp consistent with the present disclosure provides both low-beam and high-beam modes while allowing a reduced overall package size. In particular, in one embodiment, the single reflector is configured to reflect light emitted from the first solid-state light source in a low-beam pattern and further includes an aperture through which light emitted from the second solid-state light source passes in a high-beam pattern. As such, a single compartment, or cavity, is generally required for a bi-functional headlamp consistent with the present disclosure. Additionally, the reflector provides greater performance and efficiency, particularly in low-beam mode, than a projector headlamp. The configuration of the headlamp also allows greater styling flexibility for manufacturers.

Figure 1:
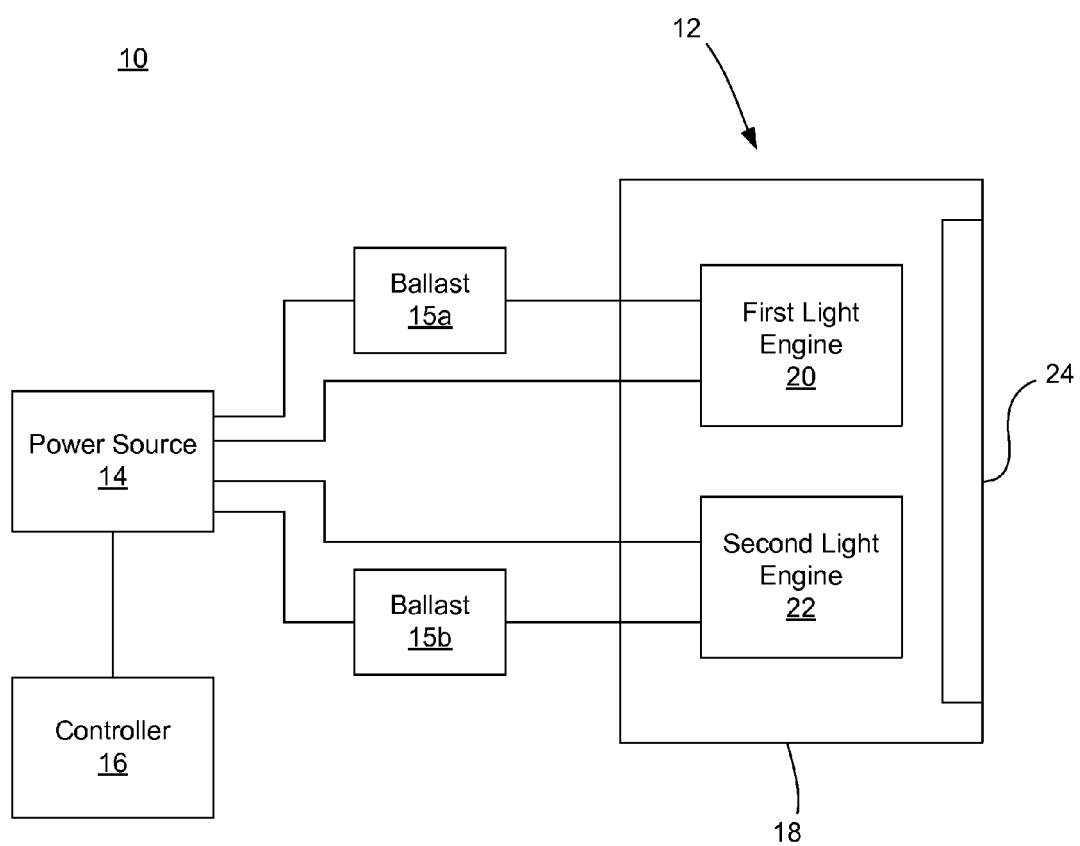
FIG. 1 illustrates a block diagram of one embodiment of a lighting system consistent with the present disclosure.

Turning now to FIG. 1, one embodiment of a lighting system 10 consistent with the present disclosure is generally illustrated. The lighting system 10 includes a light module 12, a power source 14, and a controller 16. In the illustrated embodiments described herein, the light module 12 includes an automotive headlamp or headlight. As such, the light module 12 is hereinafter referred to as "headlamp 12". The headlamp 12 includes a housing 18, a first light engine 20, a second light engine 22, and a reflector 26 (shown in FIG. 2). The housing 18 is configured to receive at least a portion of the first light engine 20 and/or the second light engine 22. The housing 18 may also include one or more outer lenses 24 as described in greater detail herein.

The headlamp 12 receives an electrical input from the power source 14, for example, to energize the light engine 20 and/or the adjustment unit 22. The power source 14 comprises a DC and/or AC power source, and may include one or more inverters, converters, and/or power conditioners. Optionally, one or more ballast circuits 15a. 15b receive an electrical input from the power source 14 and convert it to a stable output for driving the headlamp 12. One or more of the ballast circuits 15a, 15b may be positioned remotely from the headlamp 12 or may be integral with or coupled directed to the housing 18 of the headlamp 12. The controller 16 transmits one or more signals to control the operation of the lighting system 10. For example, the controller 16 transmits a signal to the power source 14 in order to selectively energize the first and/or second light engines 20, 22. The controller 16 receives an input signal generated under the control of a user and/or generated from one or more sensors such as, but not limited to, an ambient light sensor or the like (not shown) and/or from another computer system, such as, but not limited to, a vehicle electronic control system (ECU).

Figure 2:
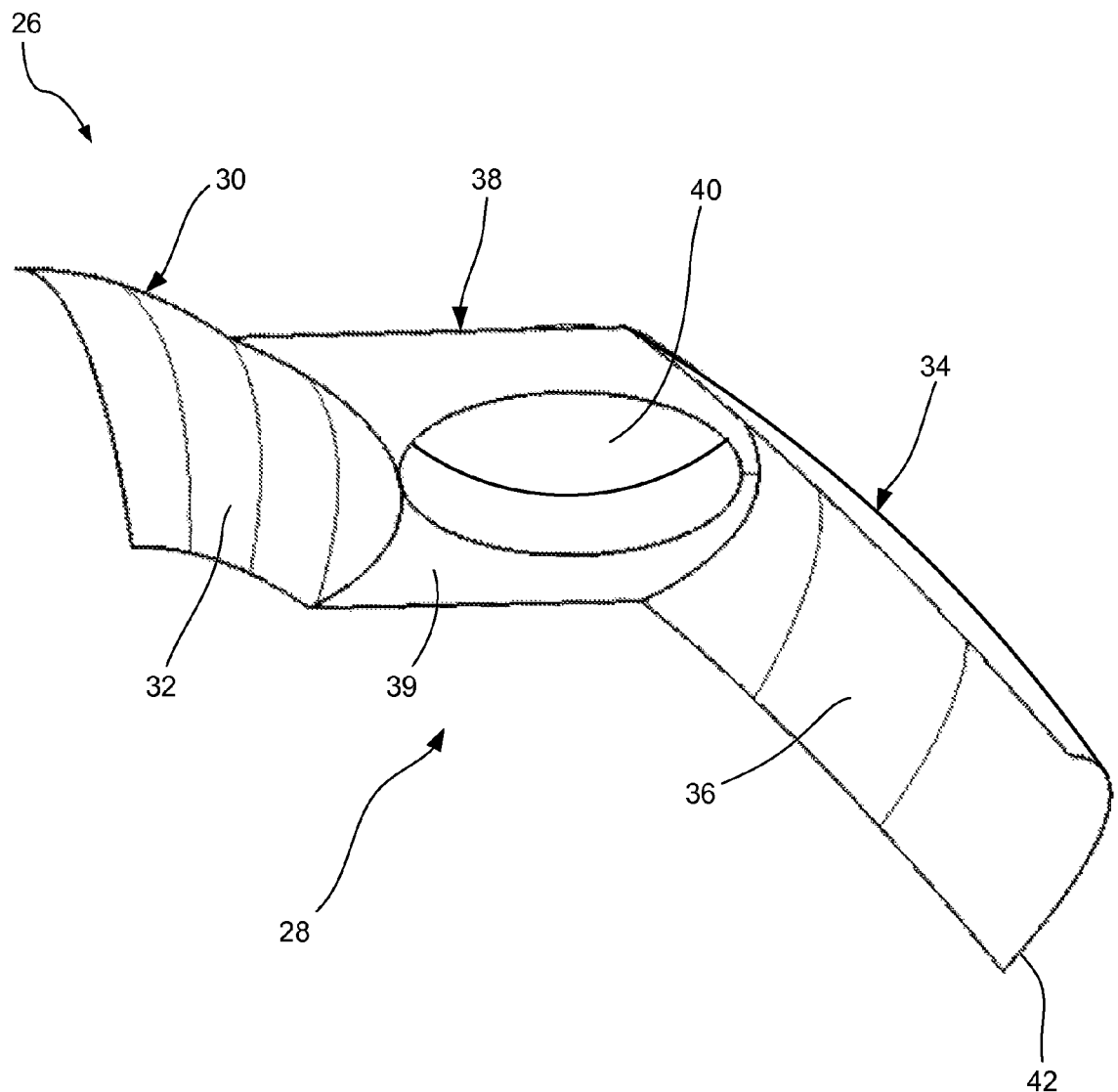
FIG. 2 illustrates a perspective view of one embodiment of a reflector of a headlamp of the lighting system of FIG. 1 consistent with the present disclosure.

Turning now to FIG. 2, a perspective view of one embodiment of a reflector 26 of a headlamp 12 is generally illustrated (the housing 18, first and second light engines 20, 22, and outer lens 24 are not shown for purposes of clarity). In the illustrated embodiment, the reflector 26 includes a light collecting region 28. As will be described in greater detail herein, the light collecting region 28 is configured to receive and reflect light emitted by at least the first light engine 20. As shown, the light collecting region 28 of the reflector 26 includes a first light receiving portion 30 having an interior reflective surface 32 and a second light receiving portion 34 having an interior reflective surface 36. The reflector 26 further includes a step portion 38 positioned between the first and second light receiving portions 30, 34. As shown, an aperture 40 is defined within the step portion 38. As shown, the first and second light receiving portions 30, 34 have generally parabolic shapes. It should be noted that the first and second light receiving portions 30, 34 (and/or the reflector 26 in general) may include a variety of shapes and/or dimensions depending on desired light distribution.

Figure 3:
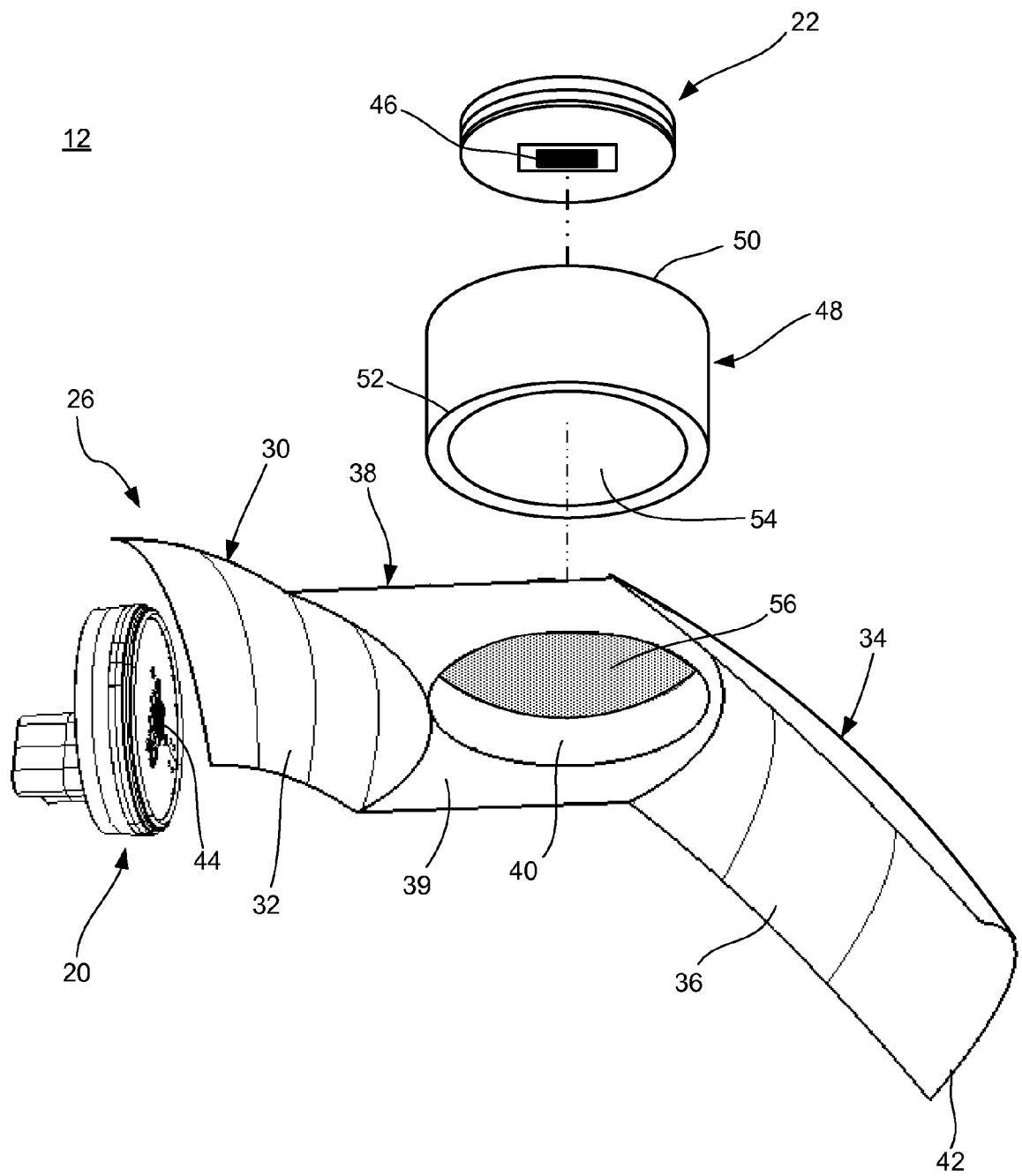
FIG. 3 illustrates an exploded perspective view of a headlamp including the reflector of FIG. 2.
Figure 4:
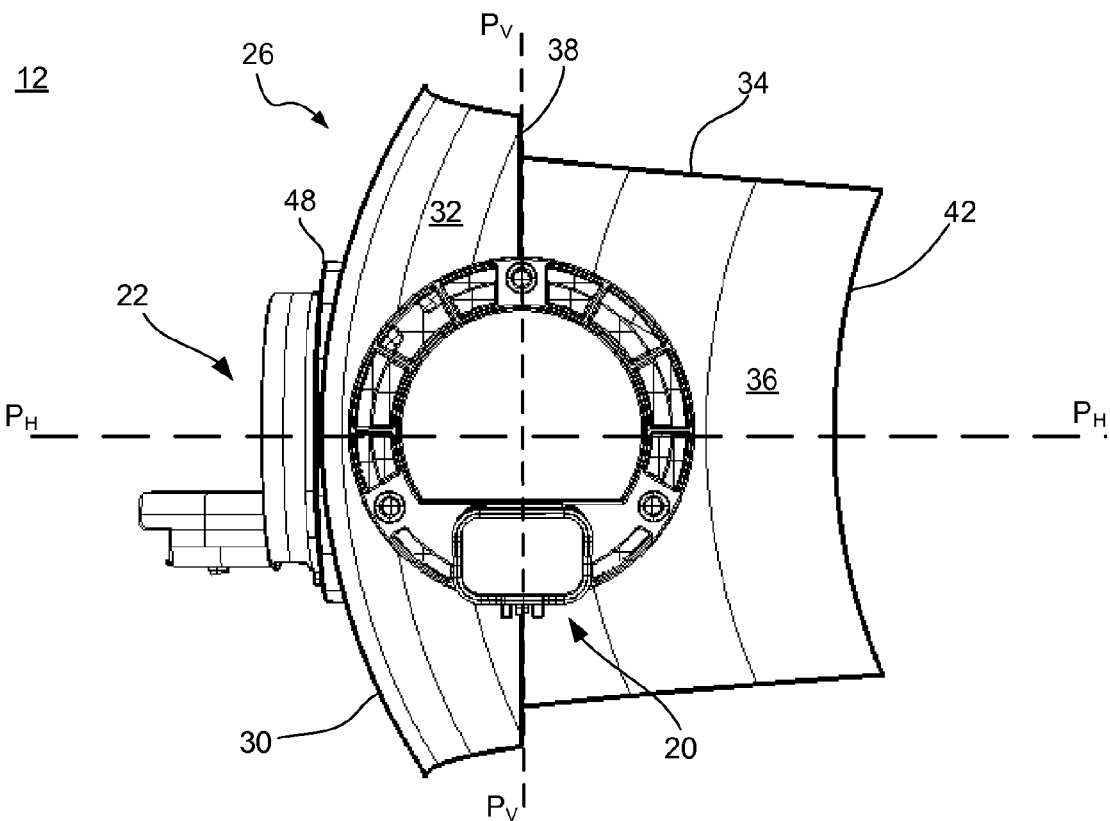
FIG. 4 illustrates a side view of the headlamp of FIG. 3.
Figure 5:
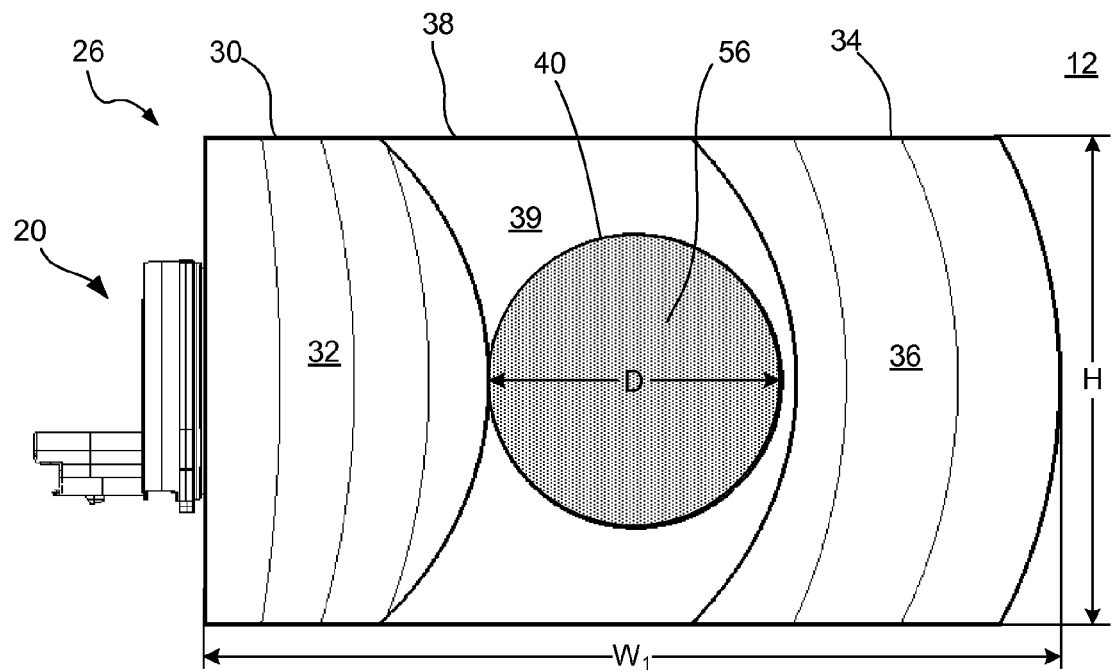
FIG. 5 illustrates a front view of the headlamp of FIG. 3.

Referring to FIG. 3, an exploded perspective view of a headlamp 12 including the reflector 26 of FIG. 2 is generally illustrated (the housing 18 and outer lens 24 are not shown for purposes of clarity). FIGS. 4 and 5 ilIlustrate side and front views, respectively, of the headlamp 12 of FIG. 3. In the illustrated embodiment, the first and second light engines 20, 22 each include a solid-state light source 44, 46, wherein the solid-state light sources 44, 46 may include a light emitting diode (LED). While the first and second light engines 20, 22 are illustrated as having single solid-state light sources 44, 46, such as single LEDs, the first and second light engines 20, 22 may include multiple solid-state light sources depending on the application. For example, the first and second light engines 20, 22 may each include a single string of multiple LEDs. The first and second solid-state light sources 44, 46 may each include a light output of 1000 lumens. In one embodiment, the first and second light engines 20, 22 may each include a commercially available LED light source sold under the trade designation JOULE JFL2 available in the U.S. from OSRAM Sylvania.

As shown, the first light engine 20 is positioned adjacent to the first light receiving portion 30. More specifically, the first light engine 20 is positioned closer to the first light receiving portion 30 than the second light receiving portion 34. As generally understood by one skilled in the art, the first light engine 20 may be side-mounted, or side-loaded, with respect to the reflector 26. The first solid-state light source 44 is adapted to emit light having a first emission pattern directed towards the interior reflective surfaces 32, 36 of the first and second light receiving portions 30, 34. As described in greater detail herein, the first and second light receiving portions 30, 34 are configured to receive and reflect light emitted by the first solid-state light source 44 such that the headlamp 12 projects a first illumination pattern based on light reflected from at least one of the first and second light receiving portions 30, 34.

The second light engine 22 is positioned behind the reflector 26 and adjacent to the step portion 38. In the illustrated embodiment, a housing member 48 couples the second light engine 22 to the aperture 40. The housing member 48 includes a first end 50 coupled to a portion of the second light engine 22 and an opposing second end 52 coupled to the step portion 38 and/or aperture 40. The housing member 48 further includes a cavity 54 defined between the first and second ends 50, 52. As shown, a lens 56 is positioned adjacent to the second end 52 of the housing member 48, wherein a portion of the lens 56 may be positioned within the aperture 40. In one embodiment, the aperture 40 has a diameter D of 60 millimeters (mm). However, it should be noted that the diameter 60 may vary depending on the desired application of the headlamp 12, such as, for example, the size and/or the desired light output of the second solid-state light source 46. It should also be noted that, although shown having a generally circular shape, the aperture 40 may include other shapes and dimensions, including, but not limited to, square, rectangular, elliptical, etc.

The second solid-state light source 46 is adapted to emit light having a second emission pattern towards the aperture 40. As described in greater detail herein, light emitted from the second solid-state light source 46 passes through the cavity 54 of the housing member 48 and the lens 56 and aperture 40 in a second illumination pattern. The lens 56 may be configured to emit light in one or more distribution patterns based on light emitted by the second solid-state light source 46. For example, the lens 56 may be configured to further aid in the distribution of the visible light emitted from the second solid-state light source 46 in either a low-beam or high-beam illumination pattern, as described in greater detail herein.

The following description is directed to one embodiment of the headlamp 12 in which the first illumination pattern is a low-beam illumination pattern and the second illumination pattern is a high-beam illumination pattern. More specifically, when in a low-beam mode, the first and second light receiving portions 30, 34 of the reflector 26 are configured to reflect light emitted by the first solid-state light source 44 in a low-beam illumination pattern and, when in a high-beam mode, the second solid-state light source 46 is configured to emit light through the aperture 40 in a high-beam illumination pattern.

However, in other embodiments, the first illumination pattern may be a high-beam illumination pattern and the second illumination pattern may be a low-beam illumination pattern. More specifically, when in a low-beam mode, the second solid-state light source 46 may be configured to emit light through the aperture 40 in a low-beam illumination pattern and, when in a high-beam mode, the first and second light receiving portions 30, 34 of the reflector 26 are adapted to reflect light emitted by the first solid-state light source 44 in a high-beam illumination pattern.

Local laws and regulations governing vehicle standards, such as Federal Motor Vehicle Safety Standards (FMVSS) and Regulations, may include specific regulations regarding the placement of low-beam and high-beam projecting portions of the headlamp. As such, depending on the region-specific laws and regulations, the mounting orientation of the headlamp 12 may vary in order to comply with such laws and regulations. For example, the headlamp 12 may be mounted in the chassis of a vehicle such that a vertical plane $P_V$, upon which the step portion 38 and aperture 40 lie, is substantially perpendicular to a horizontal plane $P_H$ along a length of the vehicle (shown in FIGS. 4, 7B and 8B, vertical plane $P_V$ and horizontal plane $P_H$ are substantially perpendicular to one another). As generally understood, the headlamp 12 may be mounted in different orientations.

Figure 6:
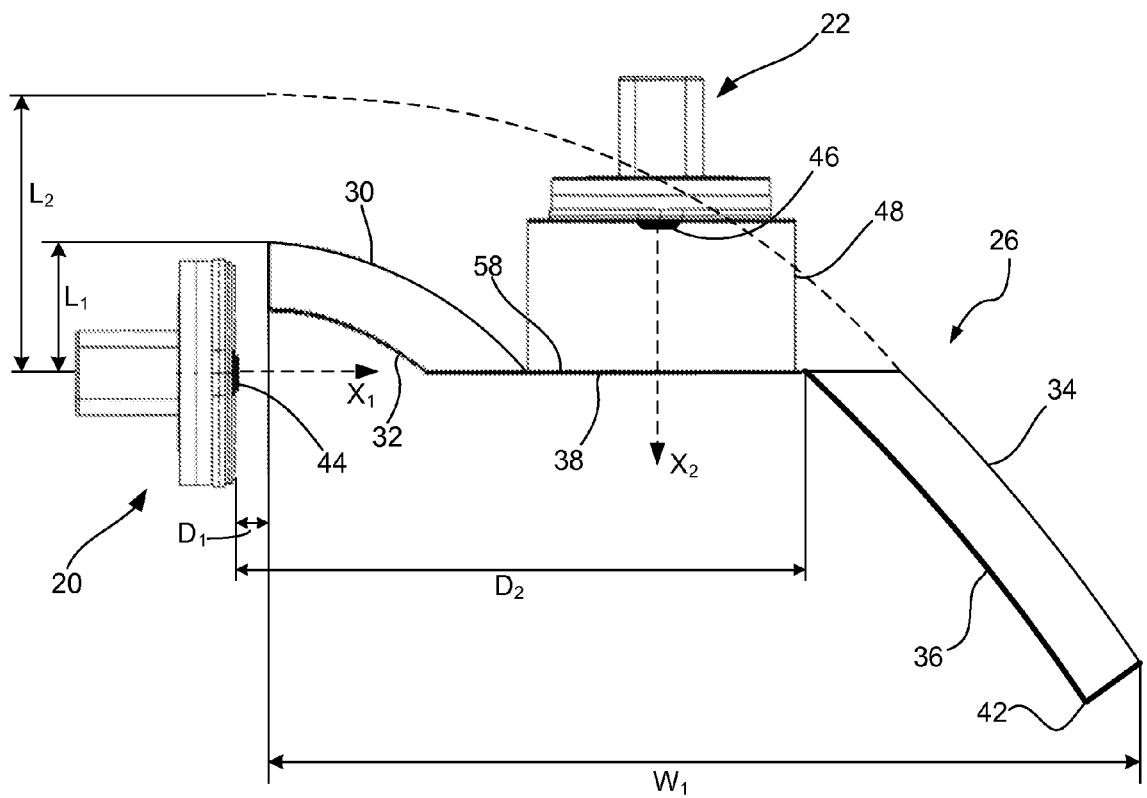
FIG. 6 illustrates a top view of the headlamp of FIG. 3.

FIG. 6 illustrates a top view of the headlamp 12 of FIG. 3. In the illustrated embodiment, the first solid-state light source 44 is positioned adjacent to the interior reflective surface 32 of said first light receiving portion 30. The first light receiving portion 30 is positioned a first distance $D_1$ from the first solid-state light source 44 and has a first focal length $L_1$. The second light receiving portion 34 is positioned a second distance $D_2$ from the first solid-state light source 44 and has second focal length $L_2$. The second distance $D_2$ and second focal length $L_2$ are greater than the first distance $D_1$ and first focal length $L_1$, respectively. In the illustrated embodiment, the first solid-state light source 44 serves as the reflector focal point upon which the first and second focal lengths $L_1$, $L_2$ are measured, wherein the first and second light receiving portions 30, 34 share the same focal point. In one embodiment, the first focal length $L_1$ is 40 mm and the second focal length $L_2$ is 60 mm.

The reflector 26 has a width $W_1$ measured from an edge of the first light receiving portion 30 to an outer edge of the second light receiving portion 34, including the step portion 38 therebetween. The reflector 26 has a height H measured from a bottom edge of the reflector 26 to a top edge of the reflector 26. In one embodiment, the $W_1$ is 175 mm and the height H is 100 mm. It should be noted that the first and second focal lengths $L_1$, $L_2$ and the width $W_1$ and height H may vary depending on the desired shape, contour and/or light output of the reflector 26, as well as other factors related to the headlamp 12.

The first solid-state light source 44 has a first emission axis $X_1$ around which the first emission pattern of the emitted light is centered. The first emission axis $X_1$ is oriented in a direction towards the interior reflective surfaces 32, 36 of the first and second light receiving portions 30, 34 of the reflector 26. The second solid-state light source 46 is positioned behind the reflector 26 and adjacent to an exterior surface 58 of the step portion 38. The second solid-state light source 46 has a second emission axis $X_2$ around which the second emission pattern of the emitted light is centered. The second emission axis $X_2$ is oriented in a direction towards the aperture 38 and at an angle relative to the first emission axis $X_1$ of the first solid-state light source 44. For example, in one embodiment, the second emission axis $X_2$ may be substantially perpendicular to the first emission axis $X_1$.

Figure 7A:
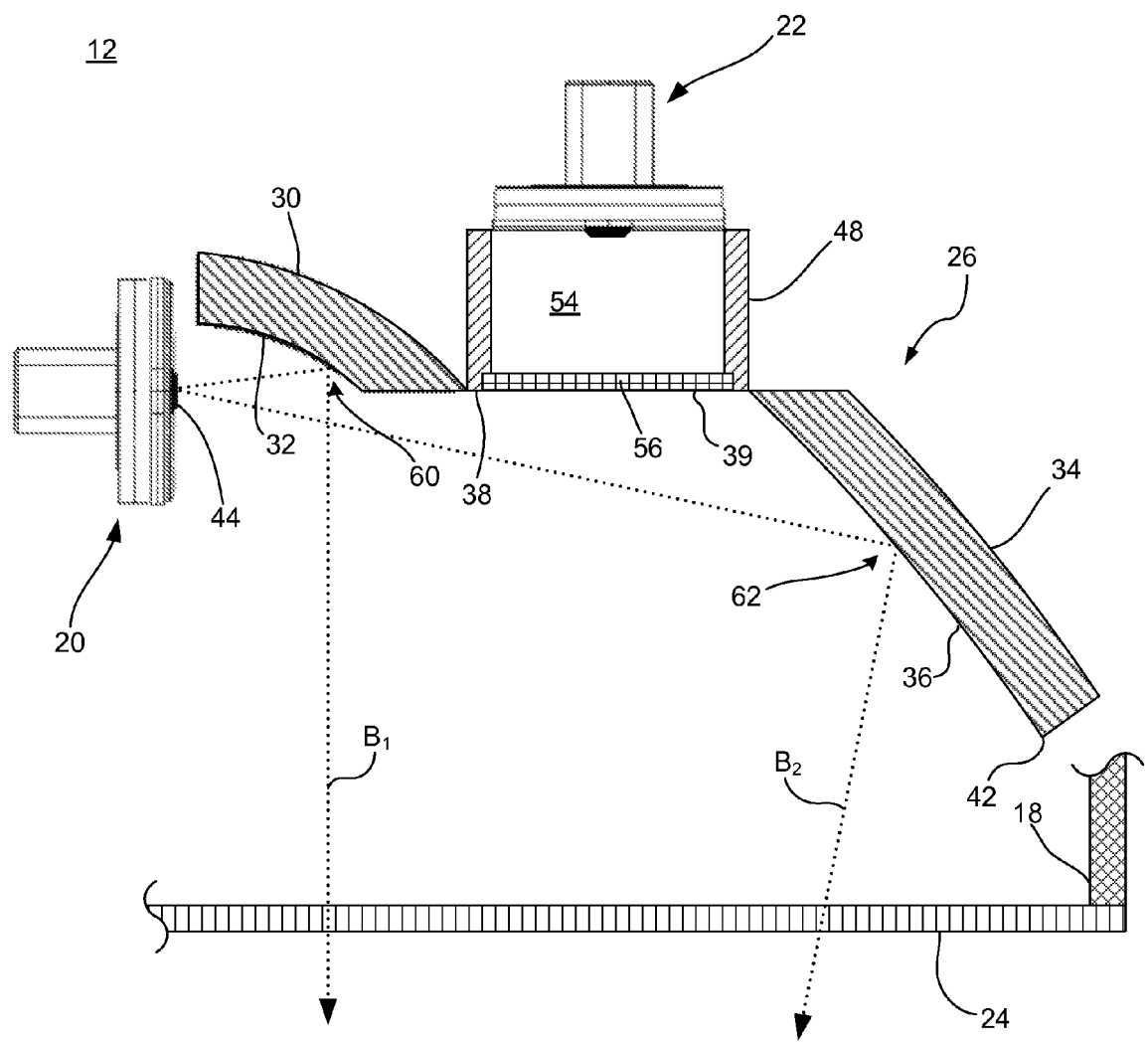
FIG. 7A illustrates a top cross-sectional view of the headlamp of FIG. 3 in a low-beam mode.
Figure 7B:
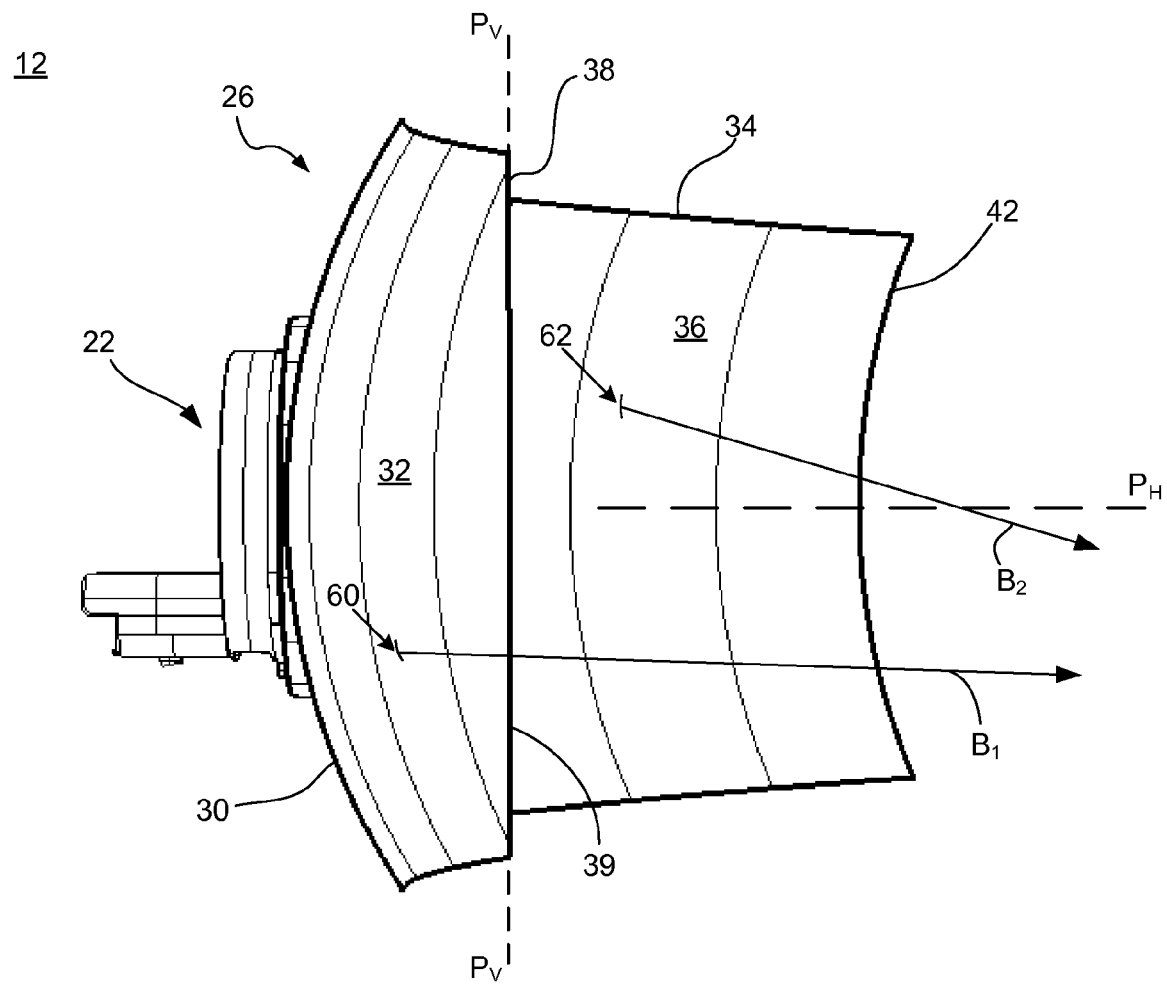
FIG. 7B illustrates a side view of the headlamp of FIG. 3 in a low-beam mode.
Figure 8A:
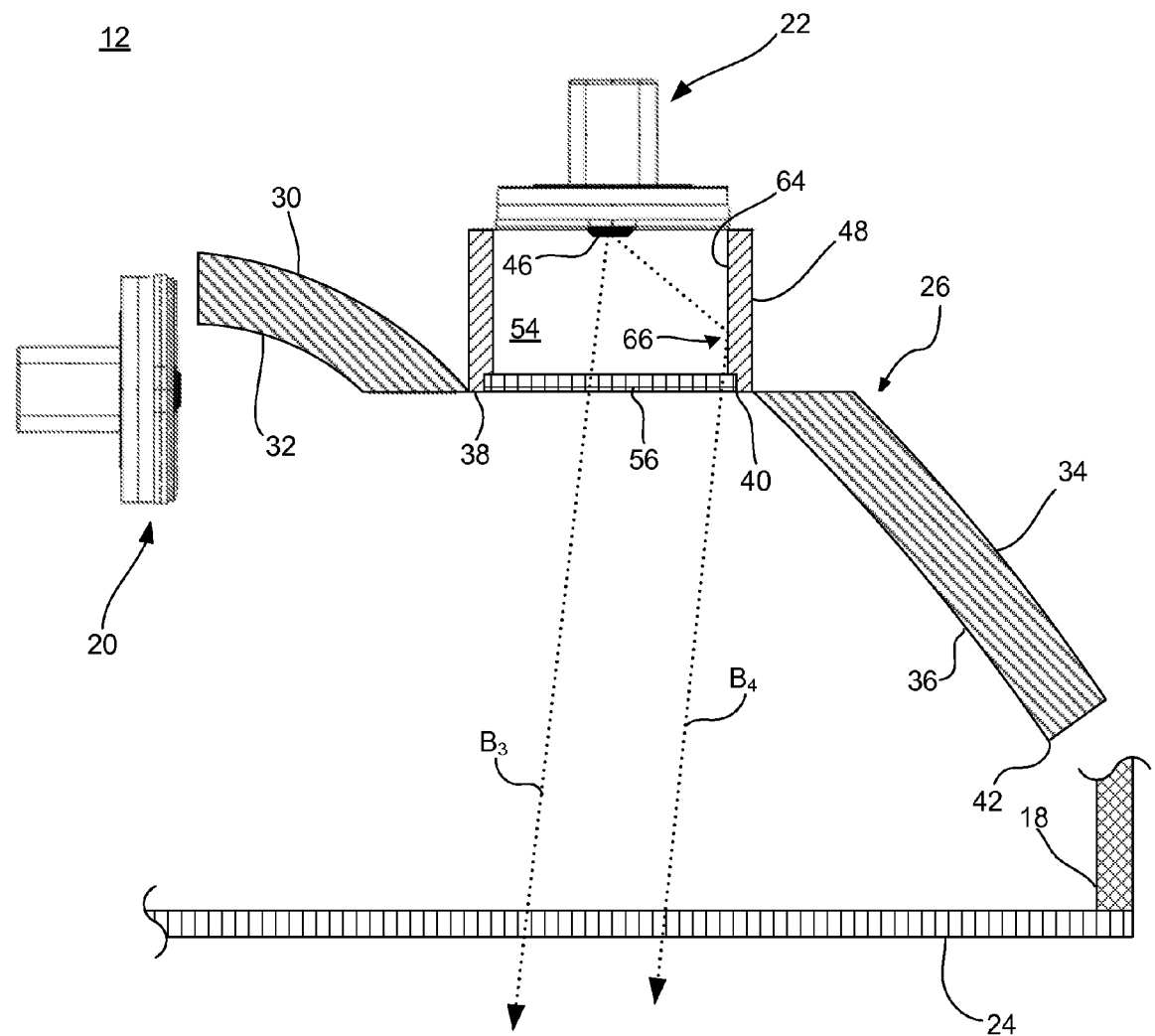
FIG. 8A illustrates a top cross-sectional view of the headlamp of FIG. 3 in a high beam mode.
Figure 8B:
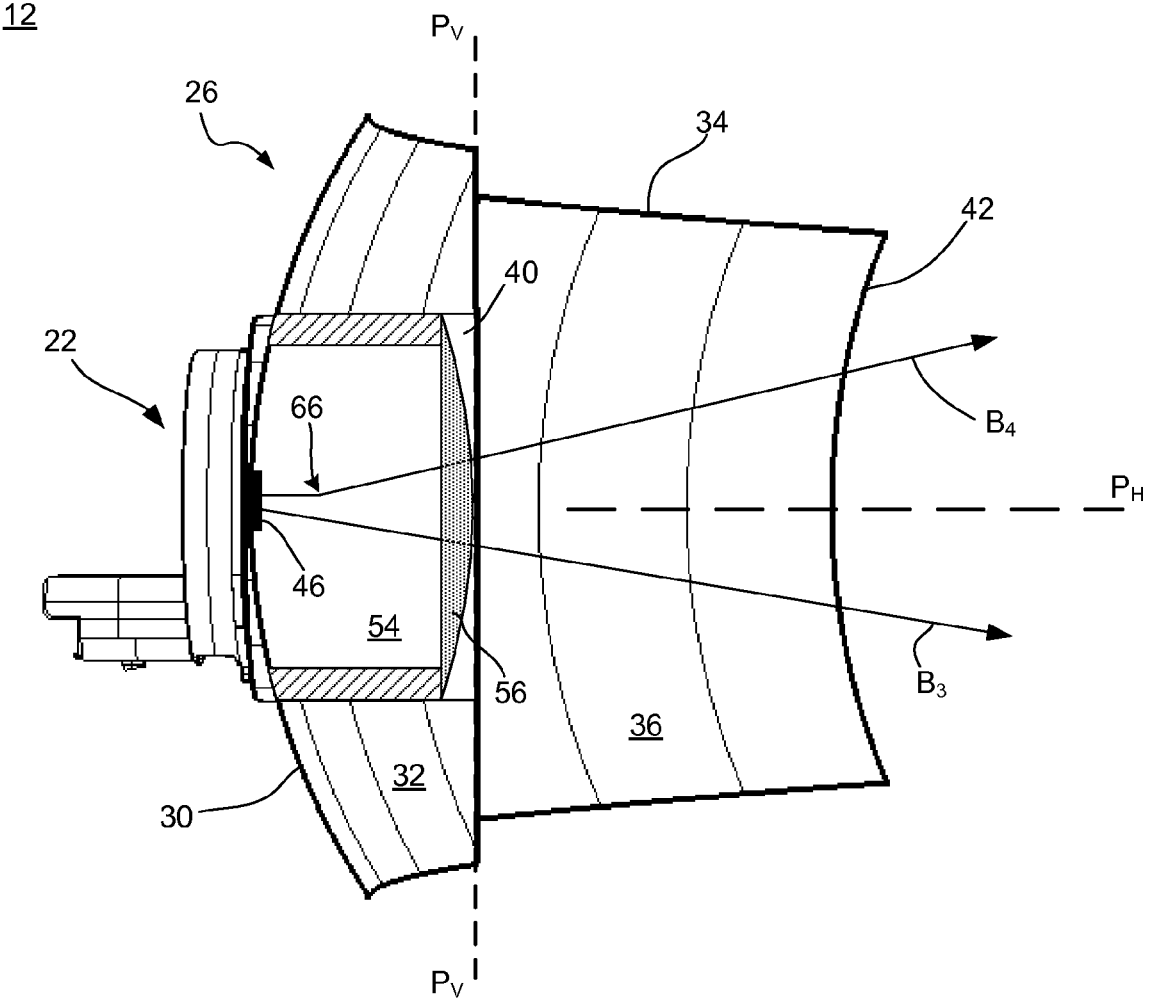
FIG. 8B illustrates a side view, partly in section, of the headlamp of FIG. 3 in a high-beam mode.

FIGS. 7A and 7B illustrate views of the headlamp 12 in a low-beam mode and FIGS. 8A and 8B illustrate views of the headlamp 12 in a high-beam mode. As shown in FIGS. 7A and 8A, the headlamp 12 includes a housing 18 shaped and/or sized to receive and enclose the reflector 26 and at least a portion of the first and/or second light engines 20, 22 within. As shown, at least a portion of the first light engine 20 is positioned within the reflector 26.

Referring to FIGS. 7A and 7B, one embodiment of the headlamp 12 is illustrated in the low-beam mode. FIG. 7A illustrates a top cross-sectional view and FIG. 7B illustrates a side view, partly in section, of the headlamp 12. In a low-beam mode, the controller 16 may transmit one or more signals configured to energize the first light engine 20, and, in turn, the first solid-state light source 44, and emit visible light from the solid-state light source 44 (e.g., illustrated schematically as light beams $B_1$ and $B_2$). For example, the controller 16 may transmit a signal to the power source 14, which may in turn provide the necessary electrical input to the first light engine 20.

As shown, the first and second light receiving portions 30, 34 of the reflector 26 are configured to receive visible light (e.g. $B_1$ and $B_2$) emitted from the first solid-state light source 44. The interior reflective surfaces 32, 36 of the first and second light receiving portions 30, 34 are configured to redirect (e.g., reflect), as indicated by arrows 60 and 62, visible light from the first solid-state light source 44 toward an open end 42 of the reflector 26, such that the visible light $B_1$ and $B_2$ is projected from the headlamp 12 generally below or at and below the horizontal plane $P_H$. As used herein, the phrase "below the horizontal plane $P_H$" means the visible light emitted from the headlamp 12 is emitted generally downwardly from the headlamp 12 and towards the ground and the phrase "at and below the horizontal plane $P_H$" means the visible light emitted from the headlamp 12 is emitted generally parallel to ground and/or downwardly from the headlamp 12 and towards the ground, referenced to a condition where the headlamp 12 is mounted in the vehicle.

As previously described, the step portion 38 and aperture 40 lie along a vertical plane $P_V$ oriented at an angle relative to the horizontal plane $P_H$. As shown in FIGS. 7A and 7B, for example, the vertical plane $P_V$ is substantially parallel to the first emission axis $X_1$ of the first solid-state light source 44 and the first solid-state light source 44 is positioned relative to the reflector 26 such that an interior surface 39 of the step portion 38 and the aperture 40 are outside of a line-of-sight (e.g., sightline or visual axis) of the first solid-state light source 44. This is shown in FIG. 7B (the first solid-state light source 44 is not shown for purposes of clarity). This configuration increases the overall light collection efficiency of the reflector 26 (only the first and second light receiving portions 30, 34 are within the line-of-sight of the first solid-state light source 44 and subject to being imparted with light).

Referring to FIGS. 8A and 8B, one embodiment of the headlamp 12 is illustrated in the high-beam mode. FIG. 8A illustrates a top cross-sectional view and FIG. 8B illustrates a side view, partly in section, of the headlamp 12. In a high-beam mode, the controller 16 may transmit one or more signals configured to energize the second light engine 22, and, in turn, the second solid-state light source 46, and emit visible light from the solid-state light source 46 (e.g., illustrated schematically as light beams $B_3$ and $B_4$). For example, the controller 16 may transmit a signal to the power source 14, which may in turn provide the necessary electrical input to the second light engine 22.

As shown, the second solid-state light source 46 is adapted to emit visible light ($B_3$ and $B_4$) generally in a direction towards the aperture 40. In the illustrated embodiment, the visible light passes through the cavity 54 of the housing member 48 and further through the lens 56 and the aperture 40 and towards the open end 42 of the reflector 26, such that the visible light $B_3$ and $B_4$ is projected from the headlamp 12 generally above and below the horizontal plane $P_H$. As used herein, the phrase "above and below the horizontal plane $P_H$" means the visible emitted from the headlamp 12 is emitted generally downwardly from the headlamp 12 and towards the ground (light beam $B_3$) and generally upwardly from the headlamp 12 and away from the ground (e.g. light beam $B_4$), referenced to a condition where the headlamp 12 is mounted in the vehicle.

The cavity 54 of the housing member 48 may include a reflective surface 64 configured to redirect (e.g., reflect), as indicated by arrow 66, visible light (e.g., light beam $B_4$) from the second solid-state light source 46 toward the lens 56 and aperture 40. As previously described, the lens 56 may be configured to project at least a portion of the visible light emitted from second solid-state light source 46 through the aperture 40 in a high-beam illumination pattern.

Optionally, the headlamp 12 also includes an outer lens 24 coupled to at least a portion of the housing 18. The outer lens 24 may be provided to increase the aerodynamics of the headlamp 12. For example, the outer lens 24 may allow the headlamp 12 to aerodynamically blend in with the adjacent portions of the vehicle to reduce aerodynamic drag. The outer lens 24 may also be configured to protect components of the headlamp 12, including, but not limited to, the first and second light engines 20, 22 and the reflector 26. The outer lens 24 may further be configured to emit visible light reflected by the reflector 26 and/or emitted by the second solid-state light source 46 in one or more distribution patterns. For example, the outer lens 24 may be configured to further aid in the distribution of the visible light emitted from the headlamp 12 in either the low-beam mode and/or high-beam mode.

Referring to FIGS. 9-13, various views of another embodiment of a reflector 26' consistent with the present disclosure is generally illustrated. The reflector 26' of FIGS. 9-13 is similar to the reflector 26 of FIGS. 2-8B and can be incorporated within the headlamp 12 of FIGS. 3-8B. As such, like numerals represent like parts.

Figure 9:
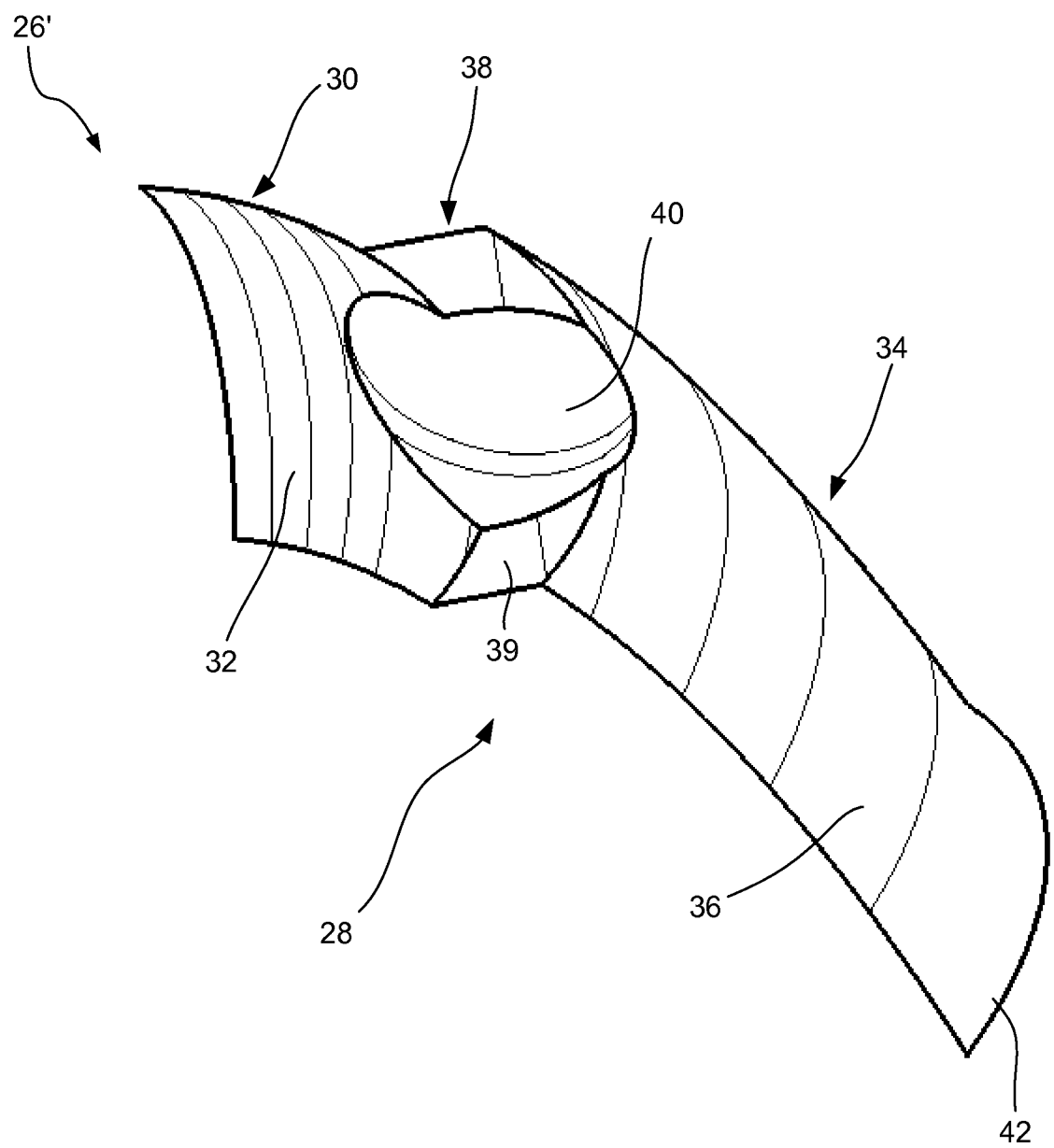
FIG. 9 illustrates a perspective view of another embodiment of a reflector of a headlamp consistent with the present disclosure.
Figure 10:
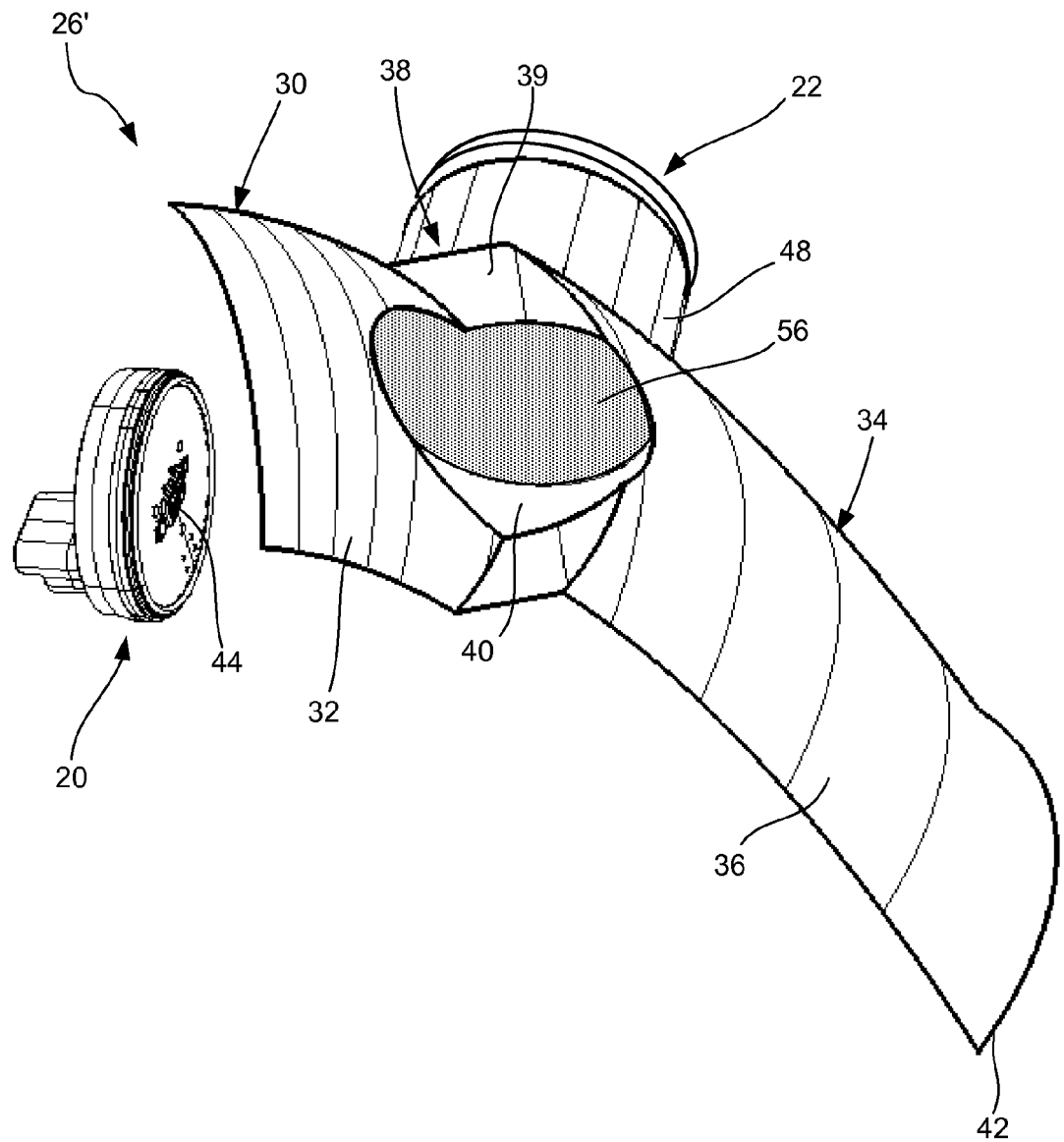
FIG. 10 illustrates a perspective view of a headlamp including the reflector of FIG. 9.
Figure 11:
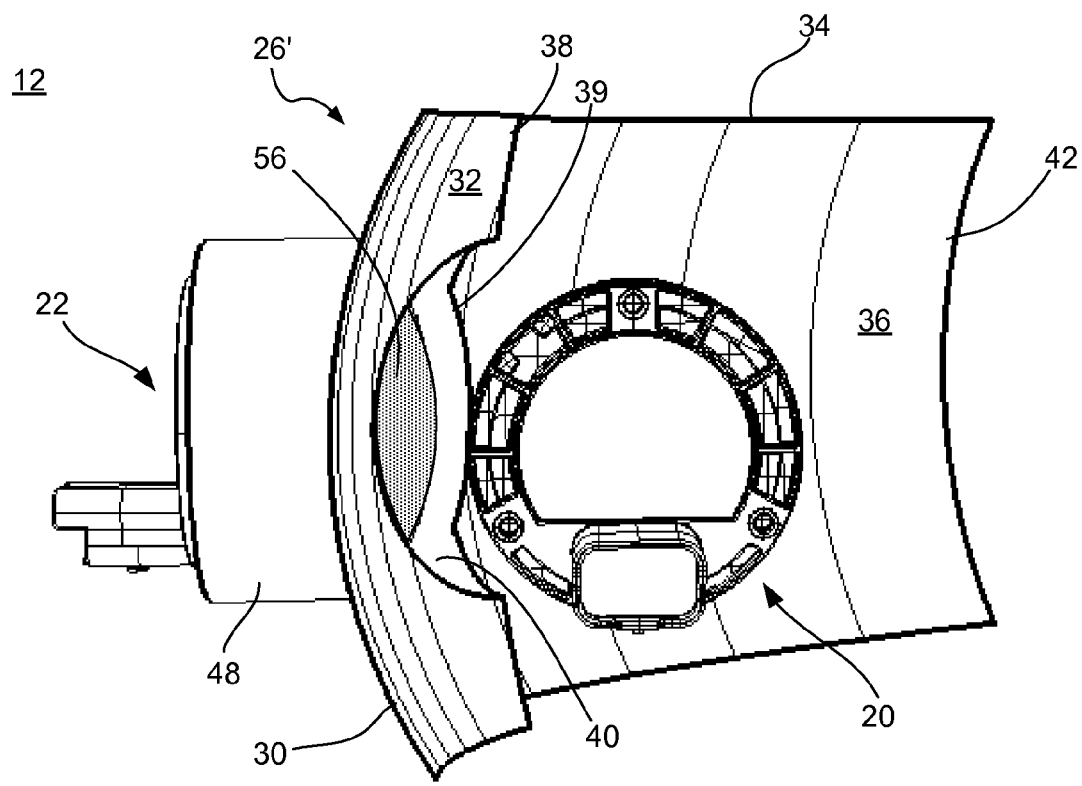
FIG. 11 illustrates a side view of the headlamp of FIG. 10.
Figure 12:
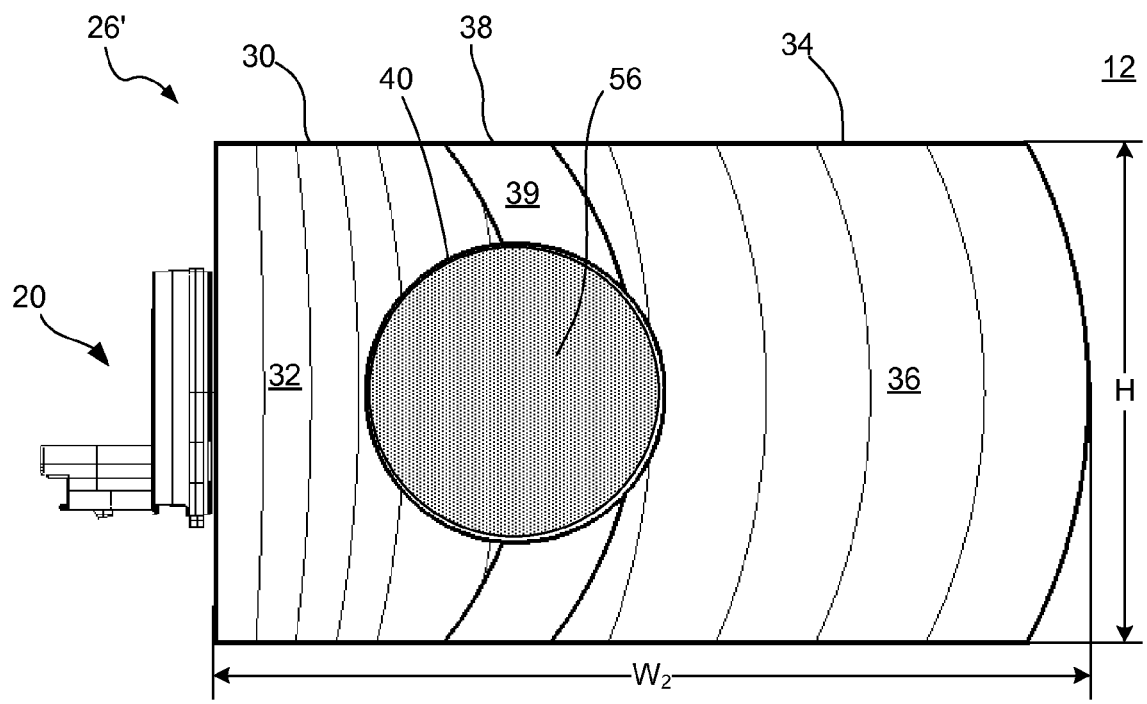
FIG. 12 illustrates a front view of the headlamp of FIG. 10.
Figure 13:
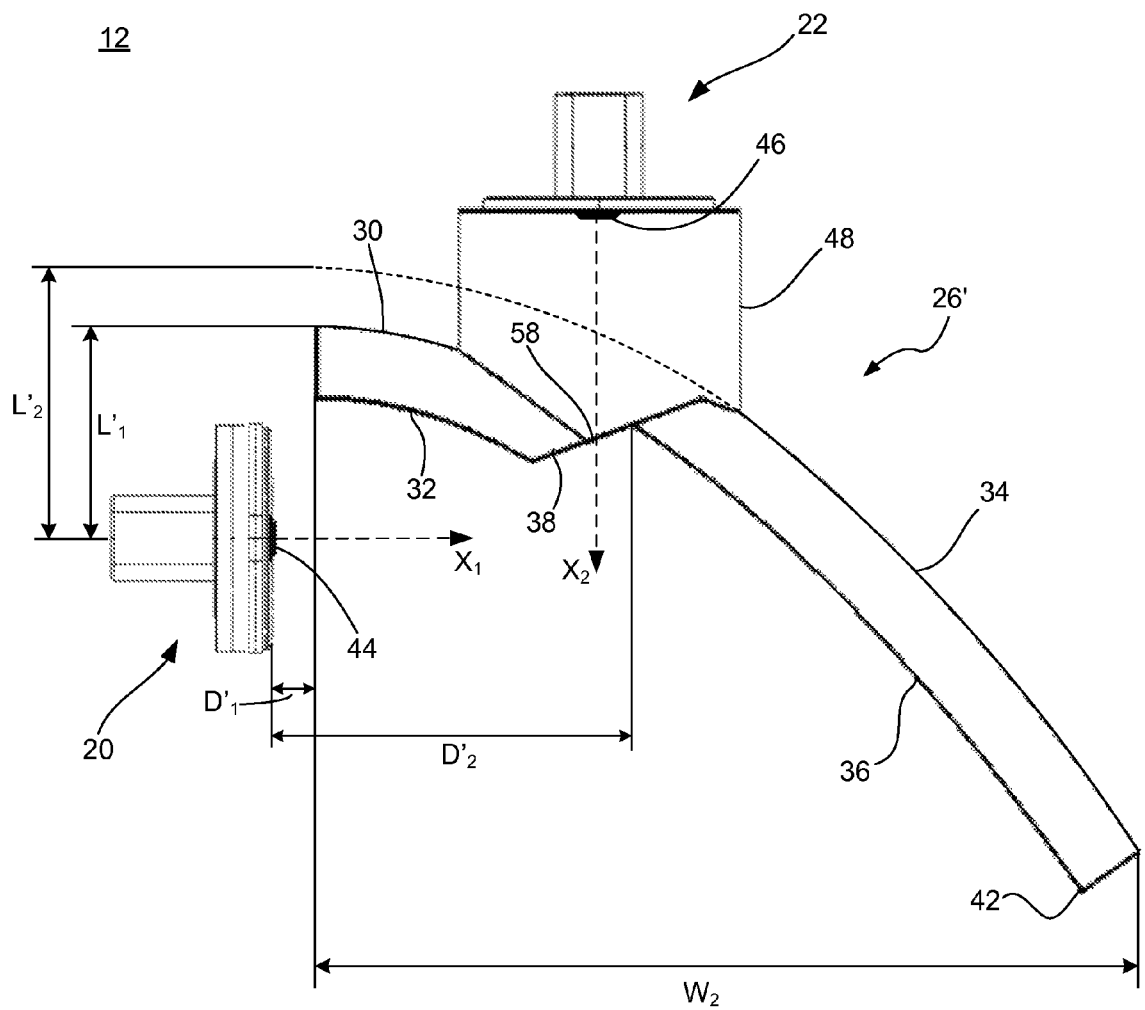
FIG. 13 illustrates a top view of the headlamp of FIG. 10.

FIG. 9 illustrates a perspective view of the reflector 26' and FIG. 10 illustrates a perspective view of the headlamp 12 including the reflector 26' of FIG. 9. FIGS. 11-13 illustrate side, front and top views of the headlamp 12 of FIG. 10. In the illustrated embodiment, the reflector 26' is similar to the reflector 26 of FIGS. 2-8B. However, the reflector 26' is more compact (e.g., reduced width) than the reflector 26. As shown in FIGS. 12 and 13, the reflector 26' has a width $W_2$ measured from the first light receiving portion 30 to the second light receiving portion 34, including the step portion 38 therebetween. The width $W_2$ of the reflector 26' is less than the width $W_1$ of reflector 26. The more compact reflector 26' provides advantages, particularly for automotive manufacturers where manufacturing tolerances with respect to size are limiting.

The reduced width $W_2$ of the reflector 26' results in a design change with respect to the aperture 40. As shown, the aperture 40 is defined within the step portion 38 as well as portions of the first and second light receiving portions 30, 34 of the reflector 26'. In order to account for the more compact size, the first solid-state light source 44 is positioned relative to the reflector 26' such that a majority of the internal reflective surface 32, 36 of the first and second light receiving portions 30, 34 is within the line-of-sight of the first solid-state light source 44. For example, as shown in FIG. 13, the first light receiving portion 30 has a first focal length $L'_1$ and the second light receiving portion 34 has second focal length $L'_2$. The first and second focal lengths $L'_1$, $L'_2$ are greater than the first and second focal lengths $L_1$, $L_2$, respectively, of reflector 26. As shown readily in FIG. 11, the interior surface 39 of the step portion 38, a portion of the aperture 40 and a portion of the lens 56 are within the line-of-sight of the first solid-state light source 44 and receive some light emitted by the first solid-state light source 44. This configuration may reduce the overall light collection efficiency of the reflector 26' (light may be imparted upon other components (e.g., aperture 40, lens 56, etc.) other than the first and second light receiving portions 30, 34).

With regard to the headlamps and reflectors described herein, the first and second light receiving portions 30, 34 of the reflectors 26, 26' are configured to receive visible light from the first solid-state light source 44 and redirect the visible light to produce a first illumination pattern (e.g. low-beam pattern). The second solid-state light source 46 is configured to emit visible light through the aperture 40 defined in the reflectors 26, 26' in a second illumination pattern (e.g. high-beam pattern). The low and high-beam patterns projected from the headlamp 12 conform to current U.S. Department of Transportation (DOT) Federal Motor Vehicle Safety Standards (FMVSS) 108 specifications for the low and high-beam output of a vehicle headlamp. It should be noted that the low and high-beam patterns projected from the headlamp 12 may also conform to current international ECE Regulations specifications for the low and high-beam output of a vehicle headlamp.

In the illustrated embodiment, the first and second light receiving portions 30, 34 of the reflector 26 are shaped and/or sized to reflect visible light from the first solid-state light source 44 out of the reflector 26 below or at and below the horizontal plane $P_H$ and not above the horizontal plane $P_H$. The second solid-state light source 46 is configured to emit visible light out of the reflector 26 above and below the horizontal plane $P_H$ (with the optional aid of the lens 56). In other embodiments in which the low and high-beam illumination patterns are reversed (e.g., first solid-state light source 44 produces high-beam pattern and second solid-state light source 46 produces low-beam pattern), the first and second light receiving portions 30, 34 of the reflector 26 are shaped and/or sized to reflect visible light from the first solid-state light source 44 out of the reflector 26 above and below the horizontal plane $P_H$ and the second solid-state light source 46 is configured to emit visible light out of the reflector 26 below or at and below the horizontal plane $P_H$ and not above the horizontal plane $P_H$ (with the optional aid of the lens 56).

As such, a headlamp consistent with the present disclosure does not require a shield, also known as a "Graves Shield", to aid in production of the low-beam and/or high-beam pattern. More specifically, some current headlamps, when in low-beam mode, require a shield to block any stray light that would otherwise strike the high-beam portion of the reflector and be cast (i.e. reflected) above the horizontal plane. Accordingly, a headlamp consistent with the present disclosure requires less components, which may reduce manufacturing costs.

The shapes of the first and second light receiving portions 30, 34 may include, but are not limited to, known parabolic, elliptical and sphero-elliptical configurations including those with faceted interior surfaces as well as truncated reflector cups. The phrase "truncated reflector cup" means a portion of a reflector cup, as may be realized, for example, by dividing a reflector cup along a plane intersecting the longitudinal axis (e.g., intersecting a first end and a second end). A truncated reflector may thus be configured as one-half of a reflector cup, but may be more or less than half of a reflector cup. For example, a truncated reflector cup may have a semi-paraboloid or semi-ellipsoid shape.

As generally understood by one of ordinary skill in the art, the first and second light receiving portions 30, 34 may include parametric and/or non-parametric surface definition types including, but not limited to, non-uniform rational basis spline (NURBS) curves and/or surfaces configured to reflect the light received from the first solid-state light source 44 in the desired pattern (i.e. low-beam and high-beam patterns). Commercially available software including, but not limited to, computer-aided design (CAD), computer-aided manufacturing (CAM), and computer-aided engineering (CAE) software, may be used for the design of NURBS curves and/or surfaces of the first and second light receiving portions 30, 34. For example, a reflector consistent with the present disclosure may be designed using LucidShape computer-aided lighting software offered by Brandenburg GmbH (Paderborn, Germany).

The reflector 26 may be selected to have a high reflectivity. For example, the reflector 26 may have a reflectivity equal to or greater than 85%. According to one embodiment, the reflector 26 may include a metal (such as, but not limited to, aluminum, copper, silver, gold, or the like), metal alloys, plastics (e.g., but not limited to, doped plastics), as well as composites. It should be appreciated that the arrangement, shape and/or contour of the first and second light engines 20, 22 and the reflector 26 will depend on the specific application of the headlamp 12 and may include (but is not limited to) such factors as the overall size constraints on the headlamp 12, desired aesthetic appearance of the headlamp 12, as well as the desired luminosity of the headlamp 12.

Accordingly, consistent with one embodiment of the present disclosure, an automotive headlamp 12 is provided. The automotive headlamp 12 includes a first solid-state light source 44, a second solid-state light source 46 and a reflector 26 having a light collecting region 28 and an aperture 40 defined therein. The first solid-state light source 44 is adapted to emit light having a first emission pattern within the light collecting region 28, wherein the light collecting region 28 is adapted to receive and reflect light emitted by the first solid-state light source 44 in a first illumination pattern. The second solid-state light source 46 is adapted to emit light having a second emission pattern passing through the aperture 40 in a second illumination pattern.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

While the principles of the present disclosure have been described herein, it is to be understood by those skilled in the art that this description is made only by way of example and not as a limitation as to the scope of the invention. The features and aspects described with reference to particular embodiments disclosed herein are susceptible to combination and/or application with various other embodiments described herein. Such combinations and/or applications of such described features and aspects to such other embodiments are contemplated herein. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The following is a list of reference numeral used in the specification:

10 lighting system
12 light module
14 power source
15 ballast
16 controller
18 housing
20 first light engine
22 second light engine
24 outer lens
26, 26' reflector
28 light collecting region of reflector
30 first light receiving portion of reflector
32 interior reflective surface of first light receiving portion
34 second light receiving portion of reflector
36 interior reflective surface of second light receiving portion
38 step portion of reflector
39 interior surface of step portion
40 aperture in step portion
42 open end of reflector
44 first solid-state light source
46 second solid-state light source
48 housing member
50 first end of housing member
52 second end of housing member
54 cavity of housing member
56 projector lens
58 exterior surface of reflector
60 reflection of light from first light receiving portion of reflector
62 reflection of light from second light receiving portion of reflector
64 reflective surface of cavity
66 reflection of light from cavity
$B_1$-$B_4$ light beams
D diameter of aperture
$D_1$ distance between first solid-state light source and first light receiving portion
$D_2$ distance between first solid-state light source and second light receiving portion
$P_H$ horizontal plane
$P_V$ vertical plane
H height of reflector
$L_1$ focal length of first light receiving portion
$L_2$ focal length of second light receiving portion
$X_1$ emission axis of first solid-state light source
$X_2$ emission axis of second solid-state light source
$W_1$ width of reflector
$W_2$ width of reflector

What is claimed is:

1. An automotive headlamp (12) comprising:
a first solid-state light source (44);

a second solid-state light source (46); and a reflector (26) having a light collecting region (28) and an aperture (40) defined therein;

wherein said first solid-state light source (44) is adapted to emit light having a first emission pattern within said light collecting region (28) and said light collecting region (28) is adapted to reflect light emitted by said first solid-state light source (44) in a first illumination pattern; and wherein said second solid-state light source (46) is adapted to emit light having a second emission pattern passing through said aperture (40) in a second illumination pattern; and wherein said light collecting region (28) of said reflector comprises:

a first light receiving portion (30) having an interior reflective surface (32) positioned a first distance ($D_1$) from said first solid-state light source (44) and having a first focal length ($L_1$);

a second light receiving portion (34) having an interior reflective surface (36) positioned a second distance ($D_2$) from said first solid-state light source (44) and having a second focal length ($L_2$), wherein said second distance ($D_2$) and second focal length ($L_2$) are greater than said first distance ($D_1$) and said first focal length ($L_1$), respectively; and a step portion (38) positioned between portions of said first and second light receiving portions (30, 34), said step portion (38) having said aperture (40) defined therein.

2. The automotive headlamp of claim 1, wherein said first solid-state light source (44) is positioned adjacent to said interior reflective surface (32) of said first light receiving portion (30) and has a first emission axis ($X_1$) around which said first emission pattern of said emitted light is centered, said first emission axis ($X_1$) oriented in a direction towards said interior reflective surfaces (32, 36) of said first and second light receiving portions (30, 34) of said reflector (26).

3. The automotive headlamp of claim 2, wherein said second solid-state light source (46) is positioned behind and adjacent to an exterior surface (58) of said step portion (38) and has a second emission axis ($X_2$) around which said second emission pattern of said emitted light is centered, said second emission axis ($X_2$) is oriented in a direction towards said aperture (38) and at an angle relative to said first emission axis ($X_1$) of said first solid-state light source (44).

4. The automotive headlamp of claim 2, wherein said step portion (38) and aperture (40) defined therein lie along a plane ($P_V$) oriented at an angle relative to said first emission axis ($X_1$) of said first solid-state light source (44).

5. The automotive headlamp of claim 4, wherein an interior surface (39) of said step portion (38) and said aperture (40) are outside of a line-of-sight of said first solid-state light source (44).

6. The automotive headlamp of claim 1, wherein said second solid-state light source (46) is positioned behind an exterior surface (58) of said reflector.

7. The automotive headlamp of claim 1, further comprising a housing member (48) coupling said second solid-state light source (46) to said aperture (40), said housing member (48) having a cavity (54) adapted to receive and provide light emitted by said second solid-state light source (46) to said aperture (40).

8. The automotive headlamp of claim 7, wherein said cavity (54) of said housing member (48) comprises a reflective surface (64) adapted to reflect light emitted from said second solid-state light source (46) in a direction towards said aperture (40).

9. The automotive headlamp of claim 1, further comprising a housing (18) enclosing said reflector (26) and portions of said first and second solid-state light sources (44, 46) within.

10. The automotive headlamp of claim 1, wherein said first and second solid-state light sources (44, 46) each comprise at least one light emitting diode (LED) light source.

11. The automotive headlamp of claim 1, wherein said first illumination pattern is a low-beam illumination pattern and said second illumination pattern is a high-beam illumination pattern.

12. A lighting system comprising the headlamp of claim 1 and further comprising a power source (14) for supplying electrical input to said first and second solid-state light sources (44, 46).

13. An automotive headlamp (12) comprising:

a first solid-state light source (44);

a second solid-state light source (46); and a reflector (26) having a light collecting region (28) and an aperture (40) defined therein;

wherein said first solid-state light source (44) is adapted to emit light having a first emission pattern within said light collecting region (28) and said light collecting region (28) is adapted to reflect light emitted by said first solid-state light source (44) in a first illumination pattern;

wherein said second solid-state light source (46) is adapted to emit light having a second emission pattern passing through said aperture (40) in a second illumination pattern; and further comprising a lens (56) positioned within a portion of said aperture (40) and adapted to project at least a portion of light emitted from said second solid-state light source (46) through said aperture (40) and away from said reflector (26).

14. An automotive headlamp (12) comprising:

a first solid-state light source (44);

a second solid-state light source (46); and a reflector (26) having a light collecting region (28) and an aperture (40) defined therein;

wherein said first solid-state light source (44) is adapted to emit light having a first emission pattern within said light collecting region (28) and said light collecting region (28) is adapted to reflect light emitted by said first solid-state light source (44) in a first illumination pattern;

wherein said second solid-state light source (46) is adapted to emit light having a second emission pattern passing through said aperture (40) in a second illumination pattern;

wherein said first illumination pattern is a low-beam illumination pattern and said second illumination pattern is a high-beam illumination pattern; and wherein said low-beam illumination pattern comprises visible light emitted generally below or at and below a horizontal plane ($P_H$) and wherein said high-beam illumination pattern comprises visible light emitted generally above and below said horizontal plane ($P_H$).

\* \* \* \* \*